US012703503B2

(12) United States Patent
Carro et al.

(10) Patent No.: US 12,703,503 B2
(45) Date of Patent: Aug. 11, 2026

(54) TRIGGERED DATA STREAMING

(71) Applicant: L3Harris Technologies, Inc., Melbourne, FL (US)

(72) Inventors: Eduardo M. Carro, Sarasota, FL (US); Darshan Gandhi, Lakewood Ranch, FL (US)

( * ) Notice: Subject to any disclaimer, the term of this patent is extended or adjusted under 35 U.S.C. 154(b) by 188 days.

(21) Appl. No.: 18/485,384

(22) Filed: Oct. 12, 2023

(65) Prior Publication Data

US 2025/0121951 A1 Apr. 17, 2025

(51) Int. Cl.

*B64D 45/00* (2006.01)
*H04N 21/214* (2011.01)
*H04N 21/233* (2011.01)
*H04N 21/238* (2011.01)

(52) U.S. Cl.

CPC ......... *B64D 45/00* (2013.01); *H04N 21/2146* (2013.01); *H04N 21/233* (2013.01); *H04N 21/238* (2013.01); *B64D 2045/0065* (2013.01)

(58) Field of Classification Search

CPC ............ B64D 45/00; B64D 2045/0065; H04N 21/233; H04N 21/2146; H04N 21/238
USPC ............................................ 381/86; 382/103
See application file for complete search history.

(56) References Cited

U.S. PATENT DOCUMENTS 4,278,976 A * 7/1981 Alpers .................. G01S 13/765 342/52
4,706,091 A * 11/1987 Scott ........................ H04B 1/40 342/60
6,385,513 B1 5/2002 Murray et al.
8,032,135 B1 * 10/2011 Redford ................ H04W 28/20 455/431
10,476,582 B1 * 11/2019 Gomez ................... H04L 65/61
11,518,539 B2 * 12/2022 Heuer .................... B64D 45/00
11,721,218 B2 * 8/2023 Zelenka ................... G08G 5/26 340/961
11,854,408 B2 * 12/2023 Hochwarth .............. G08G 5/26
2003/0095688 A1 * 5/2003 Kirmuss .......... G08B 13/19695 348/E7.086
2007/0150126 A1 * 6/2007 Crank ...................... G08G 5/74 701/4
2011/0246000 A1 * 10/2011 Shavit ...................... G08G 5/22 701/14
2015/0145704 A1 * 5/2015 Dahan ...................... G09B 9/44 340/971

(Continued)

OTHER PUBLICATIONS

Notification of Transmittal of the International Search Report and the International Written Opinion of the International Searching Authority, or the Declaration dated Feb. 4, 2025 (Feb. 4, 2025), 13 pages, issued on related International Patent Application PCT/US2024/051058 by the European Patent Office / International Searching Authority.

*Primary Examiner* — William J Deane, Jr.

(74) *Attorney, Agent, or Firm* — DICKINSON WRIGHT PLLC

(57) ABSTRACT

A triggered data streaming system captures audio from an aircraft and generates an audio signal. Once the system obtains a trigger indicating a potential emergency on the aircraft, the system streams the audio signal to an external destination outside of the aircraft. The trigger may be an external trigger received from outside the aircraft or an internal trigger generated from sensors within the aircraft.

11 Claims, 7 Drawing Sheets

(56) References Cited

U.S. PATENT DOCUMENTS

| | | | | |
|---|---|---|---|---|
| 2015/0310747 | A1* | 10/2015 | Frolik | H04B 7/18506 340/971 |
| 2016/0075443 | A1 | 3/2016 | Schmutz et al. | |
| 2016/0176538 | A1* | 6/2016 | Bekanich | G08G 5/21 701/14 |
| 2018/0181144 | A1* | 6/2018 | Steinmann | G05D 1/0022 |
| 2018/0199357 | A1* | 7/2018 | Sundararaj | G08G 5/26 |
| 2019/0154825 | A1* | 5/2019 | Esposito | H04W 4/02 |
| 2019/0371084 | A1* | 12/2019 | Krupa | G07C 5/0808 |
| 2020/0004291 | A1* | 1/2020 | Wexler | G10L 15/10 |
| 2022/0050498 | A1* | 2/2022 | Wexler | G06V 40/172 |
| 2022/0246168 | A1* | 8/2022 | Marti | G10L 25/78 |
| 2023/0084589 | A1* | 3/2023 | Ishikita | A61M 16/0463 128/200.24 |

* cited by examiner

TRIGGERED DATA STREAMING

TECHNICAL FIELD

The present disclosure relates to data streaming, particularly streaming in emergency situations.

BACKGROUND

Cockpit audio and flight data is typically recorded in an onboard memory (e.g., the "black box") that is constructed to survive a crash. The record of audio and data enables safety authorities to reconstruct a timeline of events that lead to unusual/emergency situations (e.g., mechanical failure, electrical fault, hijacking, etc.). Typically, safety authorities retrieve the recorded audio/data from the crash-survivable memory after the emergency situation is resolved.

The Global Aeronautical Distress and Safety System (GADSS) initiative was developed to detect aircraft in distress and provide information to aid search and rescue operations. Cockpit audio has been proposed as part of the data that an aircraft in distress sends to safety authorities. Streaming audio out of the aircraft may provide an option for complying with the requirements of GADSS. However, bandwidth, cost, privacy, and security considerations typically prevent constant streaming of audio from the cockpit voice recorder for the entire time of every airborne flight.

DETAILED DESCRIPTION

Overview

A computer-implemented method is provided for triggering audio/data streaming from an aircraft. The method includes capturing audio from an aircraft to generate an audio signal. The method also includes obtaining a trigger indicating a potential emergency on the aircraft and streaming the audio signal to an external destination outside of the aircraft.

Example Embodiments

In an airborne emergency situation, real-time communication (e.g., audio, video, data) may provide a vital source of information to personnel outside of the aircraft in distress. A ground station may be able to provide direct assistance to the aircraft, coordinate with law enforcement, and/or prepare search and rescue operations. Streamed real-time data from within an aircraft in distress to an external entity may enable the external entity to assist in resolving the emergency before conditions deteriorate further.

In one example, the external entity may trigger the aircraft to begin streaming in response to a direct request. For instance, a ground station may send a command via a secure datalink communication triggering the flight data recorder on the aircraft to stream data (e.g., audio data, video data, flight telemetry, etc.). The command may include parameters for the streamed data, such as the type of data (e.g., audio, video, flight data, datalink, etc.) and/or stream parameters (e.g., encryption, preferred network, etc.).

In another example, conditions on the aircraft may trigger the data recorder to begin streaming data. For instance, aircraft sensors may measure flight parameters (e.g., a high rate of descent) that may indicate an emergency condition with the aircraft, which triggers the data recorder to begin streaming data to an external destination. Additionally, a security alert (e.g., a forced opening of the cockpit door) may trigger the data recorder to begin streaming data to the external destination to allow law enforcement to monitor the situation and take appropriate actions.

Throughout this disclosure, the streamed data may be referred to as audio, cockpit audio, cockpit audio/data, and/or flight data, video. The type of data is not restricted to these forms and may include one or more of the listed data types, as well as additional data, such as datalink or multimedia data.

Figure 1:
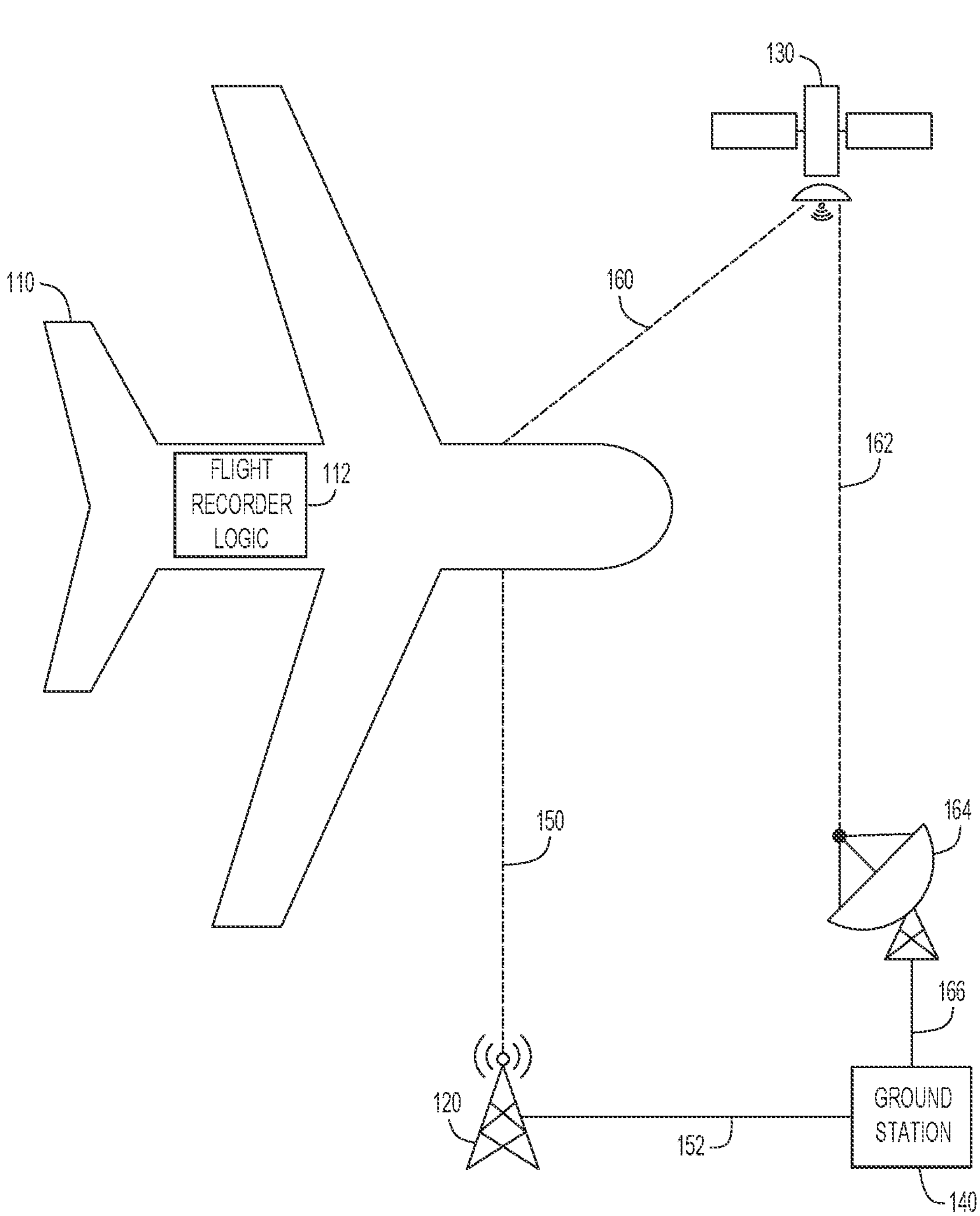
FIG. 1 illustrates one example of an emergency streaming system, according to an example embodiment.

Referring now to FIG. 1, a triggered data streaming system 100 is shown. The system 100 includes an aircraft 110 with flight recorder logic 112. In one example, the aircraft 110 may be a fixed-wing aircraft, rotary-wing aircraft, or a lighter-than-air (LTA) aircraft. In another example, the flight recorder logic 112 may include one or more computing devices configured to perform the techniques described herein.

The system 100 also includes a terrestrial network 120 (e.g., a cellular network) and a satellite network 130. The networks 120 and 130 communicate with a ground station 140 as the external destination that receives the streamed data from the aircraft 110. In one example, the terrestrial network 120 and/or the satellite network 130 may include multiple access points (e.g., cell towers or satellites), which may hand off the data stream originating from the aircraft 110 as the aircraft 110 moves relative to the individual access points.

The aircraft 110 may stream data to the terrestrial network 120 via a wireless link 150 (e.g., a 4G Long Term Evolution (LTE) or 5G transmission link). The terrestrial network 120 forwards the data stream to the ground station 140 via a communications link 152, which may include wired and/or wireless links.

The aircraft 110 may stream data to the satellite network 130 via a wireless link 160. The satellite network 130 may forward the data stream to the ground station 140 via a downlink connection 162 to a satellite antenna 164. The satellite antenna 164 is connected to the ground station 140 via a communication link 166, which may include wired and/or wireless links.

In one example, the aircraft 110 may experience an emergency situation, such as an equipment failure, a medical emergency, or a hijacking attempt. On detecting the emergency situation, the flight recorder logic 112 may begin streaming audio from the cockpit of the aircraft 110 to the ground station 140 via the terrestrial network 120 or the satellite network 130. The trigger to signal the emergency situation may be received from an external source (e.g., the ground station 140) or from an internal source (e.g., aircraft sensors). The flight recorder logic 112 may transmit additional data, such as video data or aircraft flight data, to the ground station 140.

Figure 2:
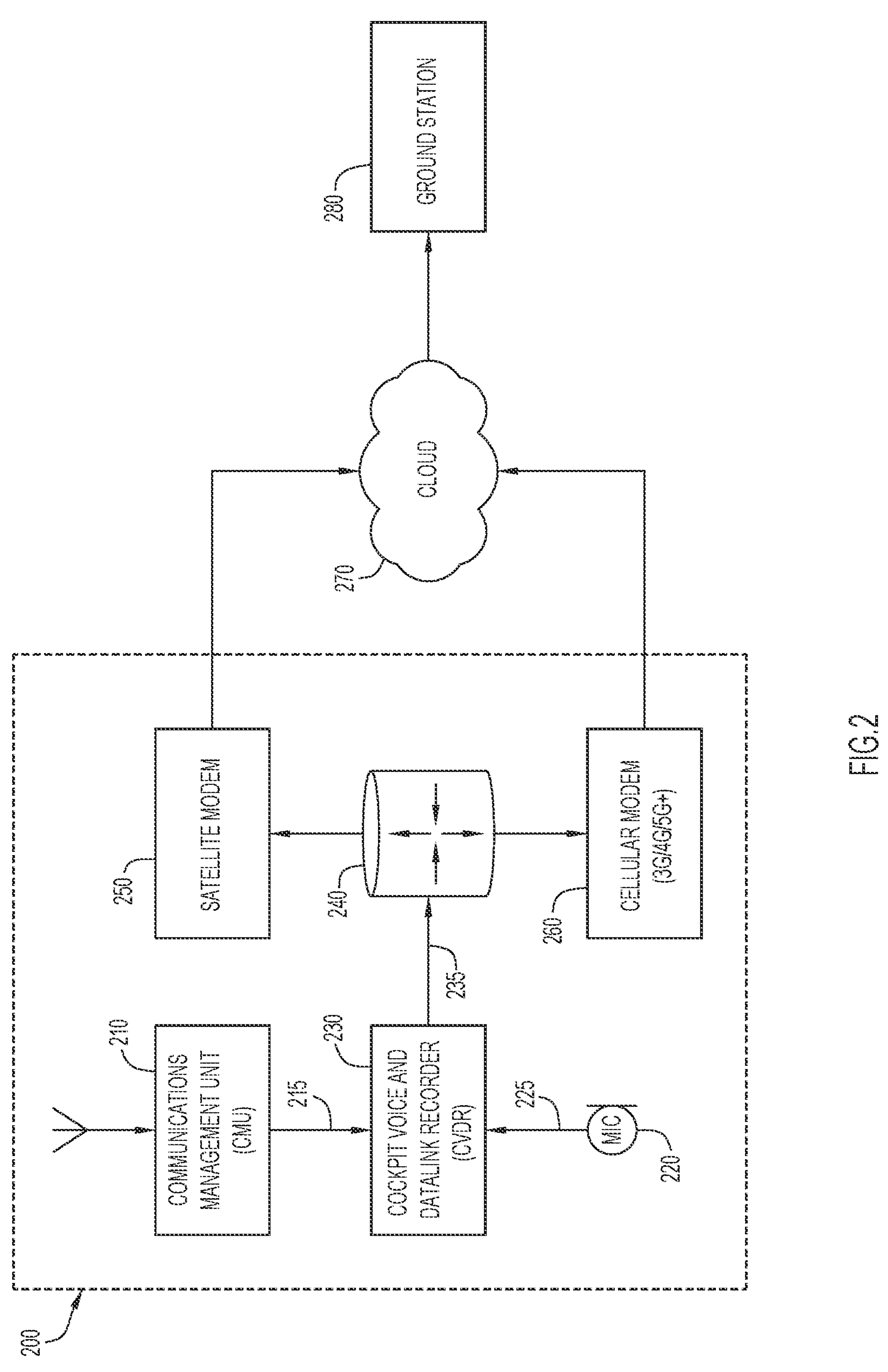
FIG. 2 is a simplified block diagram of the emergency streaming system, according to an example embodiment.

Referring now to FIG. 2, a simplified block diagram of a triggered data streaming system on an aircraft 200 is shown. The aircraft 200 includes a Communications Management Unit (CMU) 210 that provides a secure communication link between the aircraft 200 and ground systems, such as Air Traffic Control (ATC) or safety authorities. The CMU 210 typically provides a low bandwidth connection that is suitable for communicating text datalink messages 215 (e.g., transponder identifiers, flight plans, departure/arrival information, weather information, etc.). In one example, the CMU 210 communicates via the Aircraft Communications, Addressing, and Reporting System (ACARS) format. In another example, the datalink messages 215 may include a trigger to cause the aircraft systems to begin streaming data.

The aircraft 200 also includes at least one microphone 220 that captures audio from the aircraft 200. In one example, the audio may be captured from the cockpit area and/or the passenger area of the aircraft 200. The microphone 220 generates an audio signal 225 from the captured audio and provides the audio signal 225 to a data recorder 230. The CMU 210 also provides the datalink messages 215 to the data recorder 230. In one example, the data recorder 230 is a Cockpit Voice and Datalink Recorder (CVDR).

In response to a trigger, which may be included in the datalink messages 215, the data recorder 230 generates an audio stream 235 and provides the audio stream 235 to an onboard router 240. In one example, the audio stream 235 may be encrypted. The router 240 is connected to a satellite modem 250 and a cellular modem 260, and provides the audio stream 235 to one or both of the modems. The satellite modem 250 and the cellular modem 260 provide the audio stream 235 through the cloud network 270 to a ground station 280.

In one example, the data recorder 230 may include audio and/or data from a time period preceding the trigger to begin streaming. For instance, the data recorder 230 may be configured to save a rolling record that maintains a predetermined time frame (e.g., ten minutes) of audio and/or data. When the data recorder 230 detects a trigger to begin streaming real-time audio/data, the data recorder 230 may start streaming audio/data from the beginning of the saved record, i.e., on a delay of the predetermined time frame. Alternatively, the data recorder 230 may stream real-time audio/data, while also transmitting some or all of the saved record from the predetermined time frame. In other words, the data recorder may provide the saved audio/data as a transmission alongside the stream of the real-time audio/data.

Figure 3:
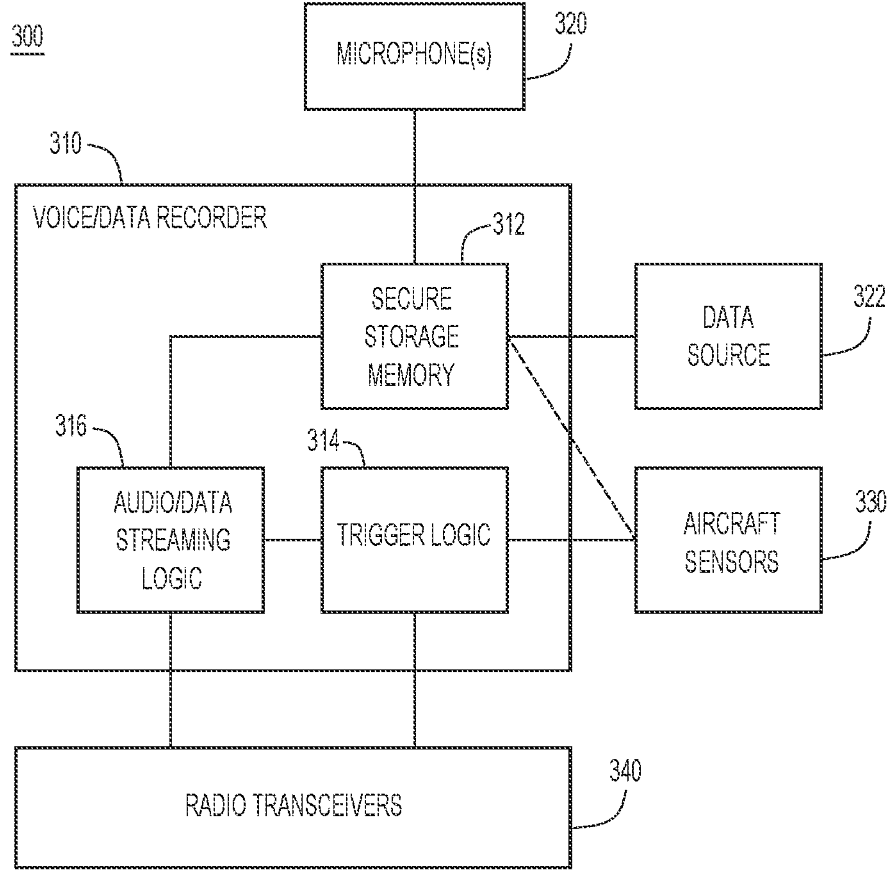
FIG. 3 is a simplified block diagram of a triggered streaming system on an aircraft, according to an example embodiment.

Referring now to FIG. 3, a simplified block diagram illustrates components of a triggered audio/data streaming system 300 on an aircraft. The system 300 is centered around voice/data recorder 310 that includes a secure storage memory 312, trigger logic 314, and audio/data streaming logic 316. In one example, the secure storage memory 312 may be a non-volatile memory that is configured to survive a crash. The secure storage memory 312 receives audio signals (e.g., cockpit audio) from one or more microphones 320. The secure storage memory 312 also receives data from data sources 322. In one example, the data sources 322 may include data link messages received by the aircraft.

The secure storage memory 312 may also receive and store data from various aircraft sensors 330. In one example, the aircraft sensors 330 may monitor flight parameters (e.g., altitude, airspeed, pitch, yaw, roll, etc.) and/or aircraft parameters (e.g., fuel level, cockpit door status, landing gear status, hydraulic systems status, etc.). Additionally, the aircraft sensors 330 may include synthesized indicators based on comparing parameters against predetermined limits that define standard operations. For instance, the aircraft sensors 330 may include an alarm indicator when certain flight parameters (e.g., pitch) exceeds a predetermined limit (e.g., 60°) for a predetermined length of time (e.g., fifteen seconds).

The aircraft sensors 330 are also connected to the trigger logic 314, which may trigger an emergency condition based on the data provided by the aircraft sensors 330. The trigger logic 314 is also connected to one or more radio transceivers 340, and the trigger logic 314 may trigger an emergency condition based on a message received from the radio transceivers 340. In one example, the trigger logic 314 may trigger an emergency condition based on an internal source (e.g., from the aircraft sensors 330) or an external source (e.g., received from the radio transceivers 340).

In another example, the aircraft sensors 330 are connected to the voice/data recorder 310 through one or more intermediary components, such as a Flight Data Acquisition Unit (FDAU). The FDAU may aggregate data from the aircraft sensors 330 and determine which data the voice/data recorder 310 should record. The intermediary components may process and/or filter the data from the aircraft sensors 330, e.g., to lessen the load on the resources of the voice/data recorder 310.

The audio/data streaming logic 316 is activated by the trigger logic 314 in an emergency condition, and provides audio/data stored in the secure storage memory 312 to the radio transceivers 340. The radio transceivers 340 transmit the audio/data to an external destination, such as a ground station. The radio transceivers may include satellite radio transceivers, cellular radio transceivers, or other wireless radio transceivers capable of communicating with an external entity. In one example, the audio/data streaming logic 316 may transmit real-time and/or saved audio/data after receiving a trigger from the trigger logic 314. Additionally, the audio/data streaming logic 316 may be configured to transmit via different radio transceivers among the radio transceivers 340 based on configurable preferences. The audio/data streaming logic 316 may also determine the content of the audio/data based on configurable preferences.

Figure 4:
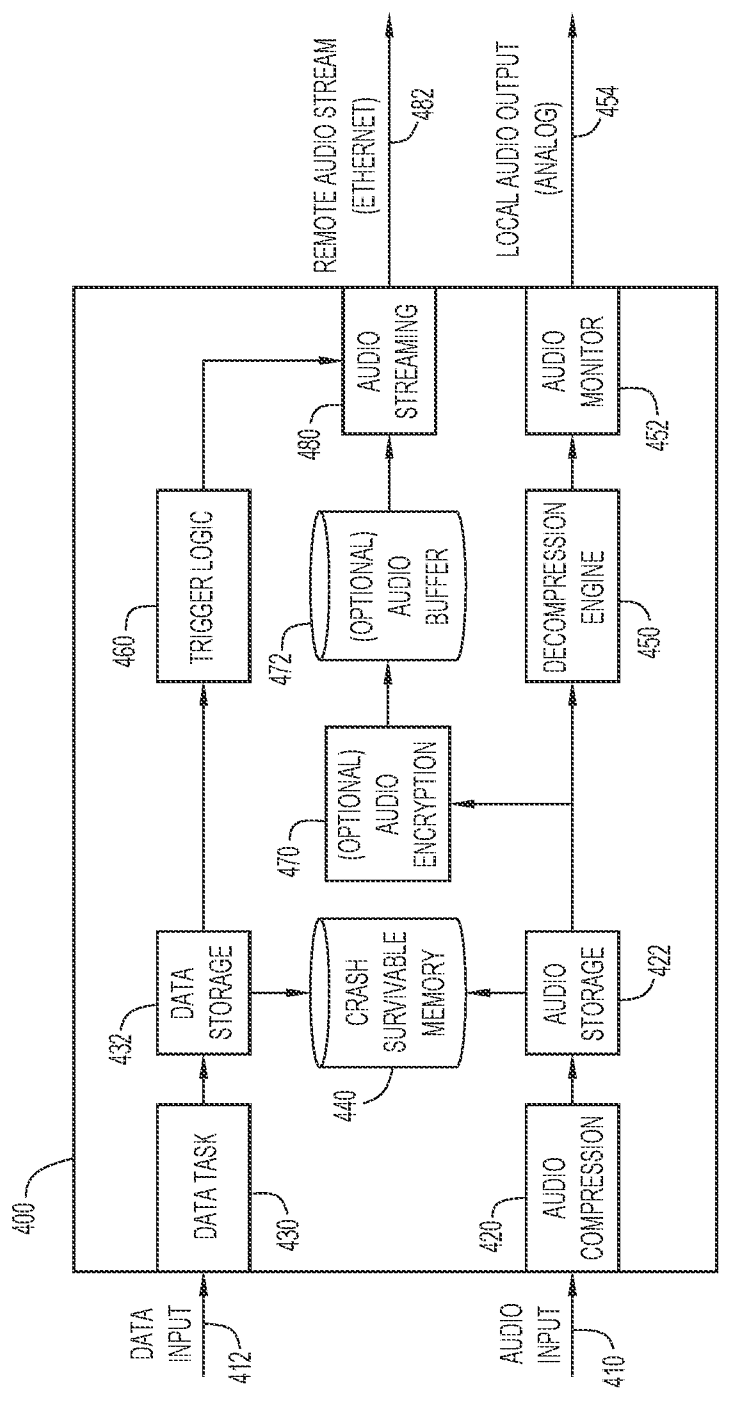
FIG. 4 is a simplified block diagram of a data recorder for use in a triggered streaming system on an aircraft, according to an example embodiment.

Referring now to FIG. 4, a block diagram illustrates a data recorder 400 configured to stream audio/data in response to a trigger. The data recorder 400 receives an audio input 410 and a data input 412. In one example, the audio input 410 may include cockpit audio, audio of radio traffic, and/or audio from passenger/cargo areas. The audio input 410 enters an audio compression module 420 that compresses the raw audio signal into a format that requires less space in an audio storage module 422. The data input 412 enters a data task module 430 that may pre-process at least a portion of the data input 412 before providing the data to a data storage module 432. In one example, the data input may include datalink information (e.g., provided by ATC), data from aircraft sensors, and/or flight data.

The audio storage module 422 and the data storage module 432 provide at least a portion of the compressed audio and the data, respectively, to a crash-survivable memory 440. For instance, the audio storage module 422 may provide the cockpit audio and the radio traffic to the crash-survivable memory 440. Similarly, the data storage module 432 may provide received datalink information to the crash-survivable memory 440.

The audio storage module 422 also provides the compressed audio signal to a decompression engine 450, which restores the compressed audio signal to a decompressed audio signal for an audio monitor module 452. The audio monitor module 452 provides a local audio output 454 (e.g., an analog audio signal) to the aircraft operators. For instance, an aircraft pilot may want to monitor the audio signal to ensure the data recorder 400 properly captures the cockpit audio.

The data storage module 432 also provides at least a portion of the data input to a trigger logic module 460. The trigger logic module 460 may further process the input data to determine whether an emergency situation indicates that audio and/or data from the aircraft will be streamed to an external destination. For instance, the trigger logic module 460 may process datalink information provided by ATC or other ground-based safety authorities to detect an external trigger from a ground station. Additionally, the trigger logic module 460 may process data from aircraft sensors and flight data to generate an internal trigger based on predetermined conditions. For instance, the trigger logic module 460 may determine that the cockpit door sensor indicates an unauthorized entry to the cockpit area and generate the internal trigger of a potential emergency situation.

The audio storage module 422 provides a copy of the compressed audio signal to an optional audio encryption module 470 and an optional audio buffer 472. The audio encryption module 470 may encrypt the compressed audio data to prevent adversaries from capturing the broadcast audio stream. The audio buffer 472 stores a predetermined length of time of the compressed audio stream to maintain a record of events that immediately precede an emergency situation. For instance, the audio buffer 472 may store audio from a rolling period of the most recent ten minutes of the compressed audio to provide an external destination with information on potential causes that lead to the emergency situation.

In one example, the data recorder 400 may determine whether to encrypt and/or buffer the audio data based on command provided in the data input 412. For instance, a ground station may send an external trigger to begin streaming audio from the aircraft and indicate that the audio be encrypted according to a predetermined encryption protocol. The external trigger may also include an indication that causes the data recorder 400 to provide at least a portion of the stored audio in the audio buffer 472 to the external destination.

In an emergency situation the trigger logic module 460 provides a trigger signal to an audio streaming module 480. Once the audio streaming module 480 receivers the trigger signal, the audio streaming module 480 gathers the compressed audio signal to provide a remote audio stream 482 to an external destination (e.g., a ground station). In one example, the remote audio stream 482 may include audio from the audio buffer 472. Additionally, the remote audio stream 482 may be encrypted by the audio encryption module 470.

In another example, the audio streaming module 480 may stream real-time audio from the audio storage module 422 while providing stored audio from the audio buffer 472 as additional data alongside the remote audio stream 482. Additionally, the audio streaming module 480 may include some or all of the data received from the data input 412 alongside the audio stream.

Figure 5:
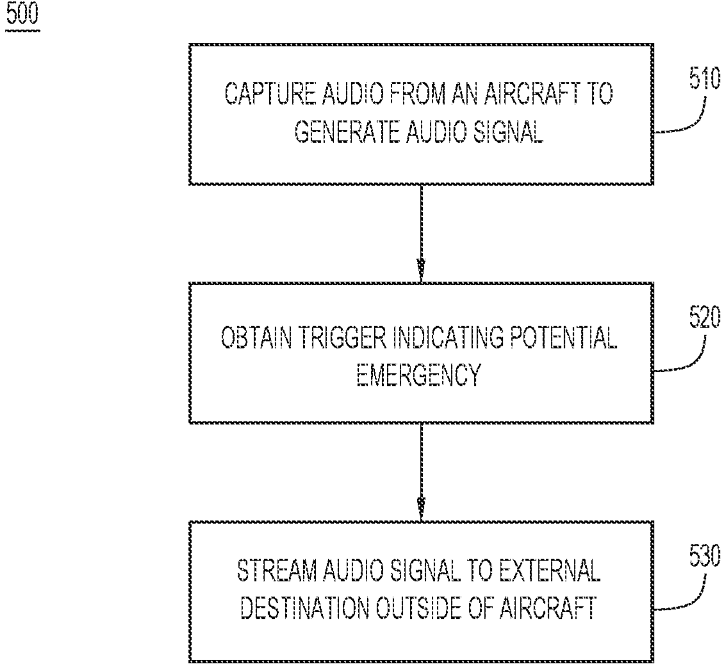
FIG. 5 is a flowchart illustrating operations performed by a triggered streaming audio system on an aircraft, according to an example embodiment.

Referring now to FIG. 5, a flowchart illustrates an example, process 500 performed by a data recorder (e.g., voice/data recorder 310 or data recorder 400) in an aircraft to stream audio data to an external destination in response to a trigger condition. At 510, the data recorder captures audio from the aircraft to generate an audio signal. In one example, the audio includes cockpit audio, radio traffic audio, and/or passenger/cargo audio. In another example, the data recorder may also receive additional data, such as datalink communications, aircraft sensor data, video data, and/or flight data.

At 520, the data recorder obtains a trigger indicating a potential emergency on the aircraft. In one example, the data recorder receives a datalink communication that includes an external trigger from ground authorities (e.g., ATC). In another example, the data recorder may obtain an internal trigger based on data available on the aircraft. For instance, an aircraft sensor (e.g., a cockpit door sensor) may indicate an unexpected condition that indicates a potential emergency (e.g., a potential hijacking if the cockpit door is forced open). In another instance, a change in flight data (e.g., airspeed, altitude, etc.) may indicate the potential emergency.

At 530, the data recorder streams the audio signal to an external destination outside of the aircraft. In one example, the data recorder may also transmit additional data (e.g., datalink communications, flight data, video data, etc.) with the streamed audio. The data recorder may stream audio from a stored buffer to provide the external destination with audio from a time period immediately preceding the trigger of the potential emergency situation. In another example, the data recorder may encrypt the audio stream and/or any additional data before transmitting to the external destination.

In a further example, the data recorder may stream the audio signal via a terrestrial network connection or a satellite network connection. The audio signal may be streamed over a relatively high bandwidth network connection in comparison to a constant network connection between the aircraft and the external destination. In other words, the aircraft may receive an external trigger via a relatively low bandwidth connection (e.g., a datalink network) and transmit the audio signal to the external destination via a relatively high bandwidth connection (e.g., a terrestrial 4G/5G network, a satellite network, etc.).

Figure 6:
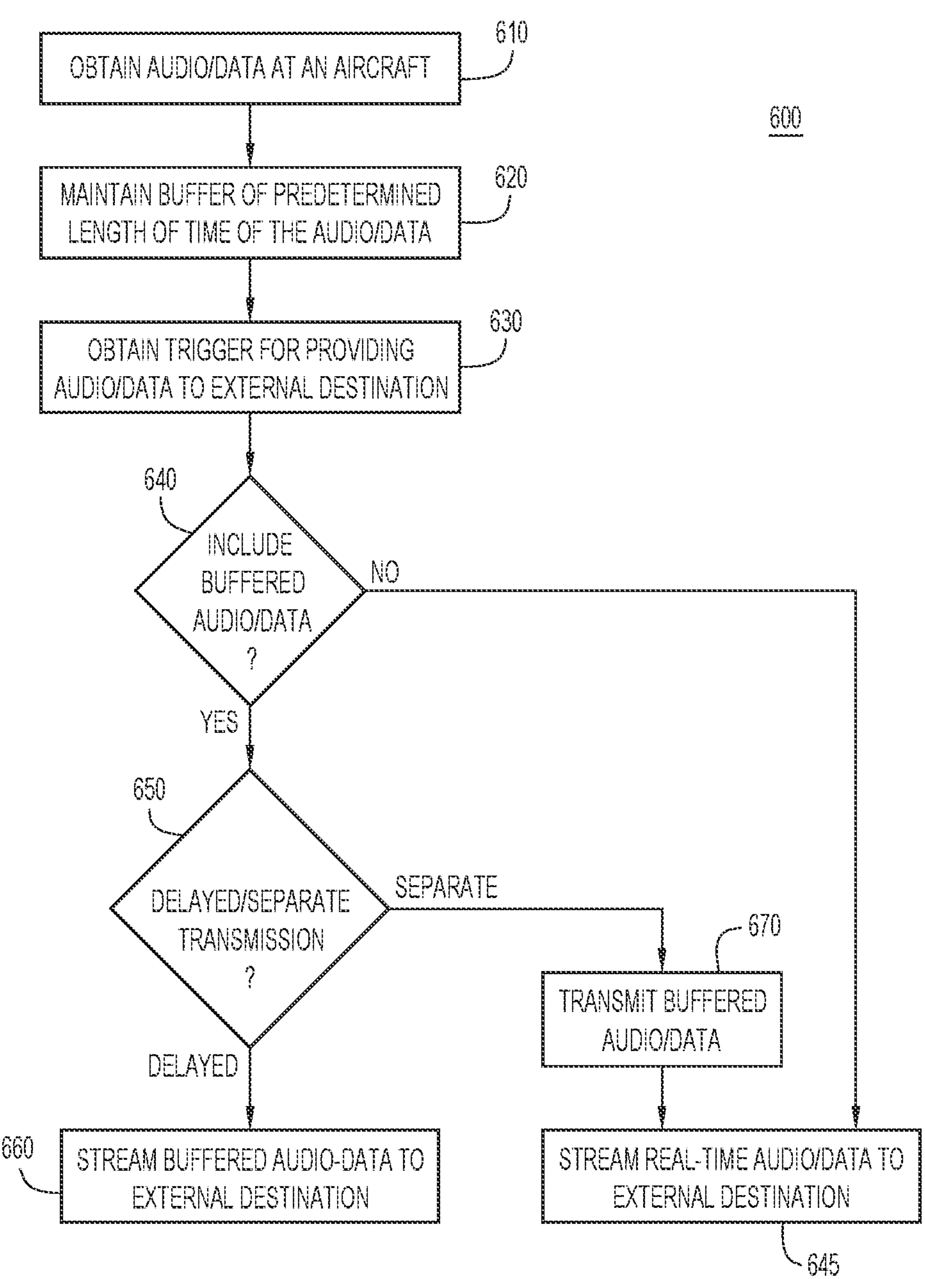
FIG. 6 is a flowchart illustrating operations performed by a data recorder on an aircraft to stream data to an external destination, according to an example embodiment.

Referring now to FIG. 6, a flowchart illustrates an example, process 600 performed by a data recorder (e.g., voice/data recorder 310 or data recorder 400) to selectively stream audio/data from an aircraft to an external destination. At 610, the data recorder obtains audio and/or data from the aircraft to generate an audio/data signal. In one example, the audio includes cockpit audio, radio traffic audio, and/or passenger/cargo audio and the data includes datalink communications, aircraft sensor data, video data, and/or flight data.

At 620, the data recorder maintains a buffer of a predetermined length of time of the audio/data signal. In one example, the buffer records the audio/data for a rolling period of time such that after the predetermined amount of time, the oldest segment of audio/data is replaced by a newly obtained segment of audio/data. In another example, the data recorder may only maintain a subset of the audio/data in the buffer. For instance, the data recorder may maintain cockpit voice recordings and aircraft sensor data, but not audio from received radio communications.

At 630, the data recorder obtains a trigger for providing audio/data to an external destination outside of the aircraft. The trigger may be an indication of an emergency condition on the aircraft. In one example, the trigger may be an external trigger obtained from an external source, which may or may not be the same as the external destination for the audio/data. For instance, a first ground station (e.g., an ATC ground station) may send a datalink communication with an embedded trigger to cause the data recorder on the aircraft to begin providing the audio/data to a second ground station (e.g., an emergency dispatch ground station).

In another example, the trigger may be an internal trigger obtained from one or more sensors on the aircraft. For instance, a cockpit door sensor may generate an internal trigger if someone forces open the cockpit door from the passenger/cargo area. The flight crew may also have an emergency button that generates an internal trigger. In another instance, detecting abnormal flight data (e.g., airspeed, altitude, roll, pitch, yaw) that exceeds predetermined limits may generate an internal trigger.

At 640, the data recorder determines whether to provide buffered audio/data to the external destination. If the data recorder determines not to include the buffered audio/data, then the data recorder starts streaming real-time audio/data at 645. In one example, the data recorder may determine whether to include buffered audio/data based on predetermined settings or based information in the trigger. For instance, the data recorder may include the buffered audio/data by default, but specific triggers (e.g., an internal trigger based on the cockpit door sensor) may override the default and only stream the real-time audio/data.

If the data recorder determines to include the buffered audio/data at 640, then the data recorder determines how to provide the buffered audio/data at 650. The data recorder may transmit the buffered audio/data as a stream at 660. In other words, the data recorder provides the streamed audio/data on a delay equal to the predetermined length of time of the buffer. The data recorder may provide the buffered audio/data at a higher speed to allow the stream to catch up to the real-time audio/data without losing the context of the buffered audio/data.

Alternatively, the data recorder may transmit the buffered audio/data separately at 670 and begin a stream of the real-time audio/data at 645. For instance, the data recorder may stream the real-time audio/data to the external destination, but the users at the external destination may rewind the stream to access the buffered audio/data that was recorded before the trigger.

Figure 7:
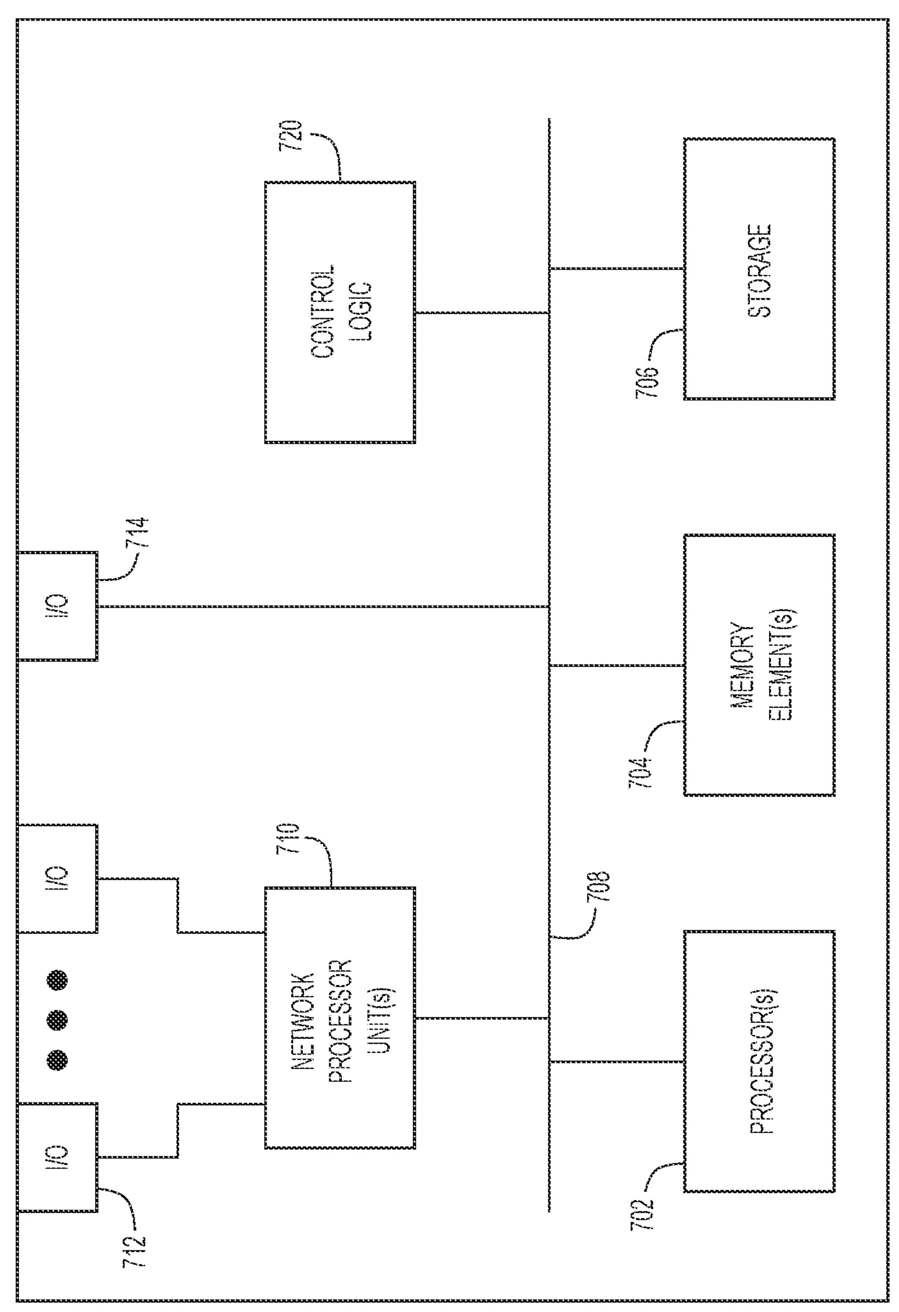
FIG. 7 is a block diagram of a computing device that may be configured to perform the techniques presented herein, according to an example embodiment.

Referring to FIG. 7, FIG. 7 illustrates a hardware block diagram of a computing device 700 (e.g., voice/data recorder 310, data recorder 400) that may perform functions associated with operations discussed herein in connection with the techniques depicted in FIGS. 1-6. In various embodiments, a computing device, such as computing device 700 or any combination of computing devices 700, may be configured as any entity/entities as discussed for the techniques depicted in connection with FIGS. 1-6 in order to perform operations of the various techniques discussed herein.

In at least one embodiment, the computing device 700 may include one or more processor(s) 702, one or more memory element(s) 704, storage 706, a bus 708, one or more network processor unit(s) 710 interconnected with one or more network input/output (I/O) interface(s) 712, one or more I/O interface(s) 714, and control logic 720. In various embodiments, instructions associated with logic for computing device 700 can overlap in any manner and are not limited to the specific allocation of instructions and/or operations described herein.

In at least one embodiment, processor(s) 702 is/are at least one hardware processor configured to execute various tasks, operations and/or functions for computing device 700 as described herein according to software and/or instructions configured for computing device 700. Processor(s) 702 (e.g., a hardware processor) can execute any type of instructions associated with data to achieve the operations detailed herein. In one example, processor(s) 702 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 704 and/or storage 706 is/are configured to store data, information, software, and/or instructions associated with computing device 700, and/or logic configured for memory element(s) 704 and/or storage 706. For example, any logic described herein (e.g., control logic 720, flight recorder logic 112, trigger logic 314, audio/data streaming logic 316) can, in various embodiments, be stored for computing device 700 using any combination of memory element(s) 704 and/or storage 706. Note that in some embodiments, storage 706 can be consolidated with memory element(s) 704 (or vice versa), or can overlap/exist in any other suitable manner.

In at least one embodiment, bus 708 can be configured as an interface that enables one or more elements of computing device 700 to communicate in order to exchange information and/or data. Bus 708 can be implemented with any architecture designed for passing control, data and/or information between processors, memory elements/storage, peripheral devices, and/or any other hardware and/or software components that may be configured for computing device 700. In at least one embodiment, bus 708 may be implemented as a fast kernel-hosted interconnect, potentially using shared memory between processes (e.g., logic), which can enable efficient communication paths between the processes.

In various embodiments, network processor unit(s) 710 may enable communication between computing device 700 and other systems, entities, etc., via network I/O interface(s) 712 (wired and/or wireless) to facilitate operations discussed for various embodiments described herein. In various embodiments, network processor unit(s) 710 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 700 and other systems, entities, etc. to facilitate operations for various embodiments described herein. In various embodiments, network I/O interface(s) 712 can be configured as one or more Ethernet port(s), Fibre Channel ports, any other I/O port(s), and/or antenna(s)/antenna array(s) now known or hereafter developed. Thus, the network processor unit(s) 710 and/or network I/O interface(s) 712 may include suitable interfaces for receiving, transmitting, and/or otherwise communicating data and/or information in a network environment.

I/O interface(s) 714 allow for input and output of data and/or information with other entities that may be connected to computing device 700. For example, I/O interface(s) 714 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 720 can include instructions that, when executed, cause processor(s) 702 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 720) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 704 and/or storage 706 can store data, software, code, instructions (e.g., processor instructions), logic, parameters, combinations thereof, and/or the like used for operations described herein. This includes memory element(s) 704 and/or storage 706 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the' (s)' nomenclature (e.g., one or more element(s)).

In summary, the techniques presented herein provide for triggered streaming of audio and data to preserve bandwidth for flying aircraft that may be experiencing an emergency. Streaming relatively large amounts of data from a flying aircraft typically requires costly communication networks (e.g., satellite networks). Controlling and reducing the amount of data transmitted reduces cost for the entire network system and improves throughput and availability for the entire communication system. The techniques presented herein limit the amount of data streamed by the entire fleet of aircraft in the air to only data from aircraft which have been triggered to stream data.

In some aspects, the techniques described herein relate to a method including: capturing audio from an aircraft to generate an audio signal; obtaining a trigger indicating a potential emergency on the aircraft; and streaming the audio signal to an external destination outside of the aircraft.

In some aspects, the techniques described herein relate to a method, wherein the trigger is an external trigger received at the aircraft over a first radio channel, the method further including streaming the audio signal to the external destination over a second radio channel, wherein the first radio channel has less bandwidth than the second radio channel.

In some aspects, the techniques described herein relate to a method, wherein the trigger is an internal trigger, the method further including: monitoring a plurality of parameters of the aircraft generated by a plurality of sensors that measure one or more conditions of the aircraft; and generating the internal trigger based on a predetermined limit of one or more of the plurality of parameters.

In some aspects, the techniques described herein relate to a method, wherein the plurality of parameters include altitude, airspeed, pitch, roll, yaw, fuel level, cockpit door status, aircraft equipment status, or emergency status.

In some aspects, the techniques described herein relate to a method, further including: storing a predetermined length of the audio signal as a buffered audio signal; and transmitting the buffered audio signal in response to obtaining the trigger.

In some aspects, the techniques described herein relate to a method, wherein streaming the audio signal begins with streaming the buffered audio signal.

In some aspects, the techniques described herein relate to a method, wherein streaming the audio signal begins with streaming a real-time audio signal, the method further including transmitting the buffered audio signal to the external destination.

In some aspects, the techniques described herein relate to a method, further including encrypting the audio signal before streaming the audio signal to the external destination.

In some aspects, the techniques described herein relate to a method, further including: capturing one or more video signals from the aircraft; and streaming the one or more video signals to the external destination in response to obtaining the trigger.

In some aspects, the techniques described herein relate to a method, further including: capturing flight data from the aircraft; and transmitting the flight data to the external destination in response to obtaining the trigger.

In some aspects, the techniques described herein relate to a flight data recorder including: one or more network interfaces; and a processor coupled to one or more network interfaces, the processor configured to: obtain an audio signal captured from an aircraft; detect a trigger indicating a potential emergency on the aircraft; select a streaming interface among the one or more network interfaces based on an available network bandwidth of the streaming interface; and cause the streaming interface to stream the audio signal to an external destination outside of the aircraft.

In some aspects, the techniques described herein relate to a flight data recorder, wherein the processor is further configured to: detect the trigger from a communication received at the aircraft via a first network interface among the one or more network interfaces that is different than the streaming interface, wherein the first network interface has less bandwidth than the streaming interface.

In some aspects, the techniques described herein relate to a flight data recorder, wherein the processor is further configured to: monitor a plurality of parameters of the aircraft generated by a plurality of sensors that measure one or more conditions of the aircraft; and generating the trigger based on a predetermined limit of one or more of the plurality of parameters.

In some aspects, the techniques described herein relate to a flight data recorder, further including a buffer memory, wherein the processor is further configured to: store a predetermined length of the audio signal in the buffer memory as a buffered audio signal; and cause the streaming interface to transmit the buffered audio signal in response to detecting the trigger.

In some aspects, the techniques described herein relate to a flight data recorder, wherein the processor is further configured to encrypt the audio signal before causing the streaming interface to stream the audio signal to the external destination.

In some aspects, the techniques described herein relate to a triggered data streaming system including: one or more radios configured to communicate with one or more radio networks; a plurality of aircraft sensors configured to monitor an aircraft; and a data recorder configured to: obtain an audio signal from at least one microphone among the plurality of aircraft sensors; detect a trigger indicating a potential emergency on the aircraft; and cause the one or more radios to stream the audio signal to an external destination outside of the aircraft via the one or more radio networks.

In some aspects, the techniques described herein relate to a triggered data streaming system, wherein the data recorder is further configured to: detect the trigger from a communication received at the aircraft via a first radio network among the one or more radio networks; and cause the one or more radios to stream the audio signal to the external destination via a second radio network that has a higher bandwidth than the first radio network.

In some aspects, the techniques described herein relate to a triggered data streaming system, wherein the data recorder is further configured to: monitor a plurality of parameters of the aircraft generated by the plurality of aircraft sensors; and detect the trigger based on a predetermined limit of one or more of the plurality of parameters.

In some aspects, the techniques described herein relate to a triggered data streaming system, wherein the data recorder is further configured to: store a predetermined length of the audio signal in a buffer memory as a buffered audio signal; and cause the one or more radios to transmit the buffered audio signal in response to detecting the trigger.

In some aspects, the techniques described herein relate to a triggered data streaming system, wherein the data recorder is further configured to encrypt the audio signal before causing the one or more radios to stream the audio signal to the external destination.

Each example embodiment disclosed herein has been included to present one or more different features. However, all disclosed example embodiments are designed to work together as part of a single larger system or method. The disclosure explicitly envisions compound embodiments that combine multiple previously-discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
- capturing audio from an aircraft to generate an audio signal;
- obtaining a trigger indicating a potential emergency on the aircraft, wherein the trigger comprises one of an external trigger and an internal trigger;
- streaming the audio signal to an external destination outside of the aircraft;
- storing a predetermined length of the audio signal as a buffered audio signal; and
- transmitting the buffered audio signal in response to obtaining the trigger;
- wherein when the trigger is the external trigger received at the aircraft over a first radio channel, the method further comprises streaming the audio signal to the external destination over a second radio channel, wherein the first radio channel has less bandwidth than the second radio channel; and
- wherein when the trigger is the internal trigger, the method further comprises:
  - monitoring a plurality of parameters of the aircraft generated by a plurality of sensors that measure one or more conditions of the aircraft; and
  - generating the internal trigger based on a predetermined limit of one or more of the plurality of parameters.

2. The method of claim 1, wherein the plurality of parameters include altitude, airspeed, pitch, roll, yaw, fuel level, cockpit door status, aircraft equipment status, or emergency status.

3. The method of claim 1, wherein streaming the audio signal begins with streaming the buffered audio signal.

4. The method of claim 1, wherein streaming the audio signal begins with streaming a real-time audio signal, the method further comprising transmitting the buffered audio signal to the external destination.

5. The method of claim 1, further comprising encrypting the audio signal before streaming the audio signal to the external destination.

6. The method of claim 1, further comprising: capturing one or more video signals from the aircraft; and streaming the one or more video signals to the external destination in response to obtaining the trigger.

7. The method of claim 1, further comprising: capturing flight data from the aircraft; and transmitting the flight data to the external destination in response to obtaining the trigger.

8. A flight data recorder comprising:
- one or more network interfaces;
- a buffer;
- a processor coupled to one or more network interfaces and the buffer, the processor configured to:
  - obtain an audio signal captured from an aircraft;
  - detect a trigger indicating a potential emergency on the aircraft, wherein the trigger comprises one of an external trigger and an internal trigger;
  - select a streaming interface among the one or more network interfaces based on an available network bandwidth of the streaming interface;
  - cause the streaming interface to stream the audio signal to an external destination outside of the aircraft;
  - store a predetermined length of the audio signal in the buffer memory as a buffered audio signal; and
  - cause the streaming interface to transmit the buffered audio signal in response to detecting the trigger;
  - detect when the trigger is the external trigger from a communication received at the aircraft via a first network interface among the one or more network interfaces that is different than the streaming interface, wherein the first network interface has less bandwidth than the streaming interface; and
  - monitor a plurality of parameters of the aircraft generated by a plurality of sensors that measure one or more conditions of the aircraft; and generating the internal trigger based on a predetermined limit of one or more of the plurality of parameters.

9. The flight data recorder of claim 8, wherein the processor is further configured to encrypt the audio signal before causing the streaming interface to stream the audio signal to the external destination.

10. A triggered data streaming system comprising:
- one or more radios configured to communicate with one or more radio networks;
- a plurality of aircraft sensors configured to monitor an aircraft; and
- a data recorder configured to:
  - obtain an audio signal from at least one microphone among the plurality of aircraft sensors;
  - detect a trigger indicating a potential emergency on the aircraft, wherein the trigger comprises one of an external trigger and an internal trigger;
  - cause the one or more radios to stream the audio signal to an external destination outside of the aircraft via the one or more radio networks;
  - store a predetermined length of the audio signal in a buffer memory as a buffered audio signal; and
  - cause the one or more radios to transmit the buffered audio signal in response to detecting the trigger;
  - detect when the trigger is the external trigger from a communication received at the aircraft via a first radio network among the one or more radio networks; and cause the one or more radios to stream the audio signal to the external destination via a second radio network that has a higher bandwidth than the first radio network; and
  - monitor a plurality of parameters of the aircraft generated by the plurality of aircraft sensors; and detect when the trigger is the internal trigger based on a predetermined limit of one or more of the plurality of parameters.

11. The triggered data streaming system of claim 10, wherein the data recorder is further configured to encrypt the audio signal before causing the one or more radios to stream the audio signal to the external destination.

* * * * *